(12) United States Patent
Matsumoto et al.

(10) Patent No.: US 8,234,745 B2
(45) Date of Patent: Aug. 7, 2012

(54) MOTOR DEVICE AND WIPER APPARATUS

(75) Inventors: Hiroshi Matsumoto, Hamamatsu (JP); Masahiko Yamanishi, Kosai (JP)

(73) Assignee: ASMO Co., Ltd., Kosai-shi, Shizuoka-ken (JP)

( * ) Notice: Subject to any disclaimer, the term of this patent is extended or adjusted under 35 U.S.C. 154(b) by 796 days.

(21) Appl. No.: 12/121,910

(22) Filed: May 16, 2008

(65) Prior Publication Data

US 2008/0282491 A1 Nov. 20, 2008

(30) Foreign Application Priority Data

May 18, 2007 (JP) ................................ P2007-133296
May 18, 2007 (JP) ................................ P2007-133297

(51) Int. Cl.
*B60S 1/24* (2006.01)

(52) U.S. Cl. ........ 15/250.3; 15/250.13; 74/147; 74/151; 74/425

(58) Field of Classification Search ................. 15/203, 15/250.13, 250.3; 310/83; 74/151, 147, 74/425, 437, 421 A; *B60S 1/24, 1/26, 1/18*
See application file for complete search history.

(56) References Cited

U.S. PATENT DOCUMENTS

| | | | | | |
|---|---|---|---|---|---|
| 2,607,065 A | * | 8/1952 | Dahlgren | ................... | 15/250.17 |
| 4,787,114 A | * | 11/1988 | Okudaira | ................... | 15/250.13 |
| 4,787,276 A | * | 11/1988 | Condon | ................... | 81/177.1 |
| 4,930,377 A | * | 6/1990 | Lester | ................... | 81/15.2 |
| 4,944,375 A | * | 7/1990 | Ohta et al. | ................... | 192/223.2 |
| 5,031,265 A | * | 7/1991 | Nakatsukasa et al. | ..... | 15/250.13 |
| 5,093,952 A | * | 3/1992 | Nakatsukasa et al. | ..... | 15/250.13 |
| 5,287,585 A | * | 2/1994 | Yamamoto et al. | ........ | 15/250.13 |
| 5,408,719 A | * | 4/1995 | DeRees et al. | ............. | 15/250.23 |
| 5,548,863 A | * | 8/1996 | Deng | ................... | 15/250.16 |
| 5,566,577 A | * | 10/1996 | Klar | ................... | 74/42 |
| 5,570,488 A | * | 11/1996 | Deng | ................... | 15/250.16 |
| 5,836,042 A | * | 11/1998 | Funk et al. | ................... | 15/250.3 |
| 5,907,885 A | * | 6/1999 | Tilli et al. | ................... | 15/250.16 |
| 5,979,256 A | * | 11/1999 | Kilker et al. | ................ | 74/89.16 |
| 5,983,439 A | * | 11/1999 | Hojnacki | ................... | 15/250.3 |
| 6,018,223 A | * | 1/2000 | Oruganty et al. | .............. | 318/10 |
| 6,205,612 B1 | * | 3/2001 | Tilli et al. | ................... | 15/250.16 |
| 6,292,975 B1 | * | 9/2001 | Isii et al. | ................... | 15/250.31 |
| 6,449,798 B1 | * | 9/2002 | Rivin et al. | ................... | 15/250.3 |
| 6,510,580 B1 | * | 1/2003 | Saitou | ................... | 15/250.31 |
| 6,553,606 B1 | * | 4/2003 | Kanazawa et al. | ......... | 15/250.31 |
| 6,687,947 B2 | * | 2/2004 | Sato et al. | ................... | 15/250.31 |

(Continued)

FOREIGN PATENT DOCUMENTS

JP 3-10940 2/1991

(Continued)

*Primary Examiner* — Gary K Graham
*Assistant Examiner* — Michael Jennings
(74) *Attorney, Agent, or Firm* — Occhiuti Rohlicek & Tsao LLP

(57) ABSTRACT

A sectoral reduction gear is arranged between a motor portion and a link mechanism. The sectoral reduction gear rotates in a reciprocating manner in a predetermined angle range on the basis of a forward rotation and a reverse rotation of the motor portion. An outer periphery of the sectoral reduction gear defines an imaginary circle. An inner region of the imaginary circle has an operating range in which the sectoral reduction gear, which rotates in a reciprocating manner, passes, and a non-operating range, in which the sectoral reduction gear does not pass. As seen from an axial direction of an output shaft, a part or the whole of the output shaft is arranged in the non-operating range.

18 Claims, 7 Drawing Sheets

U.S. PATENT DOCUMENTS

| | | | | |
|---|---|---|---|---|
| 6,718,593 B2 * | 4/2004 | Shido | | 15/250.31 |
| 6,886,212 B2 * | 5/2005 | Machida | | 15/250.3 |
| 7,287,450 B1 * | 10/2007 | Liao | | 81/177.9 |
| 7,322,069 B1 * | 1/2008 | Lin | | 15/250.3 |
| 7,409,747 B2 * | 8/2008 | Chen | | 16/430 |
| 7,412,743 B2 * | 8/2008 | Lin | | 15/250.003 |
| 7,568,257 B2 * | 8/2009 | Yagi et al. | | 15/250.3 |
| 7,657,963 B2 * | 2/2010 | Bendo | | 15/250.3 |
| 7,669,275 B2 * | 3/2010 | Yagi | | 15/250.31 |
| 7,673,366 B2 * | 3/2010 | Yagi et al. | | 15/250.3 |
| 7,676,880 B2 * | 3/2010 | Moein et al. | | 15/250.3 |
| 7,685,670 B2 * | 3/2010 | Yagi et al. | | 15/250.3 |
| 7,739,771 B2 * | 6/2010 | Powell, Jr. | | 15/250.23 |
| 7,748,075 B2 * | 7/2010 | Nakano | | 15/250.02 |
| 7,895,702 B2 * | 3/2011 | Tisch et al. | | 15/250.17 |
| 2003/0131436 A1 * | 7/2003 | Rapp | | 15/250.3 |
| 2004/0049875 A1 * | 3/2004 | Metz | | 15/250.27 |
| 2004/0216257 A1 * | 11/2004 | Weigold et al. | | 15/250.3 |
| 2004/0221413 A1 * | 11/2004 | Hultquist et al. | | 15/250.001 |
| 2006/0043803 A1 * | 3/2006 | Yagi | | 310/68 B |
| 2008/0282491 A1 * | 11/2008 | Matsumoto et al. | | 15/250.13 |

FOREIGN PATENT DOCUMENTS

JP    11-034805    2/1999

* cited by examiner

MOTOR DEVICE AND WIPER APPARATUS

BACKGROUND OF THE INVENTION

The present invention relates to a motor device and a wiper apparatus. The motor device is provided with a motor portion which can be rotated forward and in reverse, and a link mechanism coupled drivingly to the motor portion. The link mechanism is integrally assembled in the motor portion. The wiper apparatus is provided with the motor device and a wiper control circuit controlling the motor device.

A motor device disclosed in Japanese Laid-Open Patent Publication No. 11-34805 is used as a wiper motor reciprocating a vehicle wiper. A link mechanism compensate for a lack of torque.

In the case that the link mechanism is not provided, and an output shaft of the wiper motor is directly connected to the wiper to reciprocate the wiper, a positional accuracy of the wiper may deteriorate in the case that the wiper is positioned at an upper reverse position and in the case that the wiper is positioned at a lower reverse position. This is because the wiping force and the wiping speed of the wiper directly depend on a predetermined drive torque and rotation speed of the wiper motor. That is, the lack of torque of the wiper motor may be generated near the lower reverse position and the upper reverse position, where a relatively great wiping force is needed to operate the wiper. The lower reverse position of the wiper also serves as a stop position of the wiper.

However, the link mechanism of the publication mentioned above transmits a rotating motion output by the motor portion to the wiper while converting the rotating motion into reciprocation such that a higher torque is generated at the upper reverse position and the lower reverse position of the wiper. Accordingly, the positional accuracy of the wiper is improved at the lower reverse position and the upper reverse position, and the lack of torque is compensated for. In other words, the link mechanism complements the output characteristic of the motor portion.

There is a tendency that a mounting space of the wiper apparatus to a vehicle is limited more and more. Accordingly, there is a demand for an adjustment of a layout of constituting parts of the wiper motor so as to downsize the wiper motor serving as a driving source of the wiper apparatus.

DISCLOSURE OF THE INVENTION

An objective of the present invention is to provide a wiper motor which can be downsized.

In accordance with one aspect of the present invention, a motor device is provided. The motor device is provided with a motor portion capable of rotating forward and in reverse, and a link mechanism coupled drivingly to the motor portion. The link mechanism is integrally assembled in the motor portion. A sectoral reduction gear is arranged between the motor portion and the link mechanism. The sectoral reduction gear is rotated in a reciprocating manner in a predetermined angle range on the basis of the forward rotation and the reverse rotation of the motor portion. A sectoral shape of the sectoral reduction gear has a size corresponding to a reciprocating rotation of the sectoral reduction gear. The sectoral reduction gear has an outer periphery. The outer periphery defines an imaginary circle. An inner region of the imaginary circle has an operating range through which the sectoral reduction gear rotating in a reciprocating manner in the predetermined angle range passes, and a non-operating range through which the sectoral reduction gear does not pass. The output shaft is rotated in a reciprocating manner by the link mechanism. A part or the whole of the output shaft is arranged in the non-operating range as seen from an axial direction of the output shaft.

Further, in accordance with another aspect of the present invention, a motor device having a link mechanism rotating an output shaft in a reciprocating manner between a first reverse position and a second reverse position is provided. The first reverse position also serves as a stop position of the output shaft. The link mechanism is provided with a first lever that is swung in a reciprocating manner by the motor portion, a third lever to which the output shaft is fixed so as to be integrally rotatable, and a second lever coupling the first lever to the third lever so as to make the output shaft rotatable. The link mechanism sets a rotation angle range of the output shaft less than one half rotation. A first straight line in which the first lever and the second lever are aligned is defined. A first imaginary straight line which is defined when the first lever and the second lever are aligned is provided independently from the first straight line. In the case that the first lever and the second lever are aligned on the first straight line, the output shaft is positioned at the first position. In the case that the first lever and the second lever are aligned on the first imaginary straight line, the output shaft is positioned at a first imaginary position. A second imaginary straight line is defined when the second lever and the third lever are aligned prior to the first imaginary position. In the case that the second lever and the third lever are aligned on the second imaginary straight line, the output shaft is positioned at a second imaginary position. The first reverse position is set at the first position. The second reverse position is set at a position immediately before the second imaginary position.

Further, in accordance with another aspect of the present invention, a wiper apparatus is provided. The wiper apparatus is provided with a wiper which is rotated in a reciprocating manner between a lower reverse position and an upper reverse position. The lower reverse position also serves as a stop position of the wiper. The motor device drives the wiper. A wiper control circuit controls the motor device. The wiper control circuit sets the first reverse position to a first position, and sets the second reverse position to a position immediately before a second imaginary position.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

FIGS. 1 to 4 show a wiper apparatus in accordance with a first embodiment of the present invention.

Figure 1:
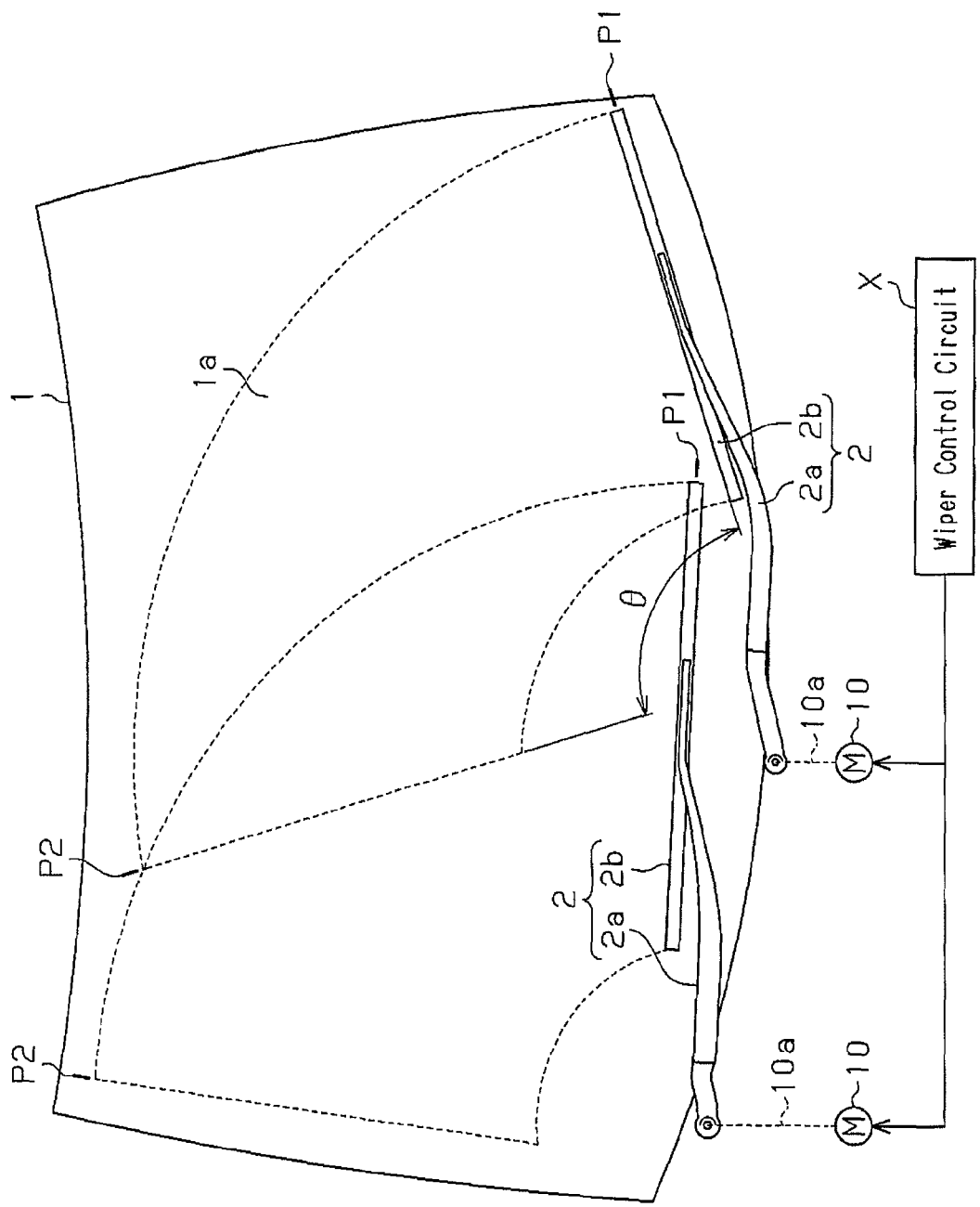
FIG. 1 is a plan view of a wiper apparatus in accordance with a first embodiment of the present invention.

As shown in FIG. 1, the wiper apparatus is provided with a pair of wipers 2, a pair of wiper motors 10, and a wiper control circuit X. The wiper control circuit X synchronously controls both wiper motors 10. The wiper motors 10 each serving as a motor device respectively reciprocate and rotate the wipers 2. Each of the wipers 2 wipes rainwater or the like on a glass surface 1a corresponding to a surface-to-be-wiped of a vehicle front glass 1. Each of the wipers 2 is swung in a reciprocating manner between a lower reverse position P1 and an upper reverse position P2. The wiper 2 positioned at the lower reverse position P1 extends in a lateral direction of the vehicle, and the wiper 2 positioned at the upper reverse position P2 extends in a vertical direction. Since each of the lower reverse positions P1 also serves as a stop position of the wiper 2, it can be expressed by "stop/lower reverse position". Each of the lower reverse position P1 and the upper reverse position P2 indicates an end of swinging motion of the wiper 2.

As shown in FIG. 1, each of the wipers 2 is provided with a wiper arm 2a and a wiper blade 2b. An output shaft 10a of the wiper motor 10 is coupled to a proximal end of each of the wiper arms 2a so as to be integrally rotatable. A proximal end of the wiper blade 2b is rotatably coupled to a distal end of each of the wiper arms 2a. Each of the wiper blades 2b follows a curved shape of the glass surface 1a in correspondence to a position of rotation of the wiper arm 2a. A range of rotation of each of the output shafts 10a is less than one half rotation.

FIGS. 2A to 4 shows in detail one of two wiper motors 10 which are identical to each other. Each of the wiper motors 10 has a motor portion 11 and a link mechanism 12. The link mechanism 12 is coupled drivingly to a motor shaft 13. The link mechanism 12 is integrally assembled in the motor portion 11.

As shown in FIG. 2A, the motor portion 11 is constituted by a direct-current motor. The motor portion 11 is provided with a motor housing 15, the motor shaft 13, and feed brushes (not shown). The motor housing 15 rotatably supports the motor shaft 13 serving as a rotary shaft. An output shaft 10a extends in a vertical direction to the motor shaft 13. The wiper control circuit X controls each of the motor portions 11 in such a manner as to control a forward rotation and a reverse rotation of the motor shaft 13. A worm gear 13a is integrally formed in the motor shaft 13. The motor shaft 13 is rotated between an end position of the forward rotation and an end position of the reverse rotation of the motor portion 11.

Figure 4:
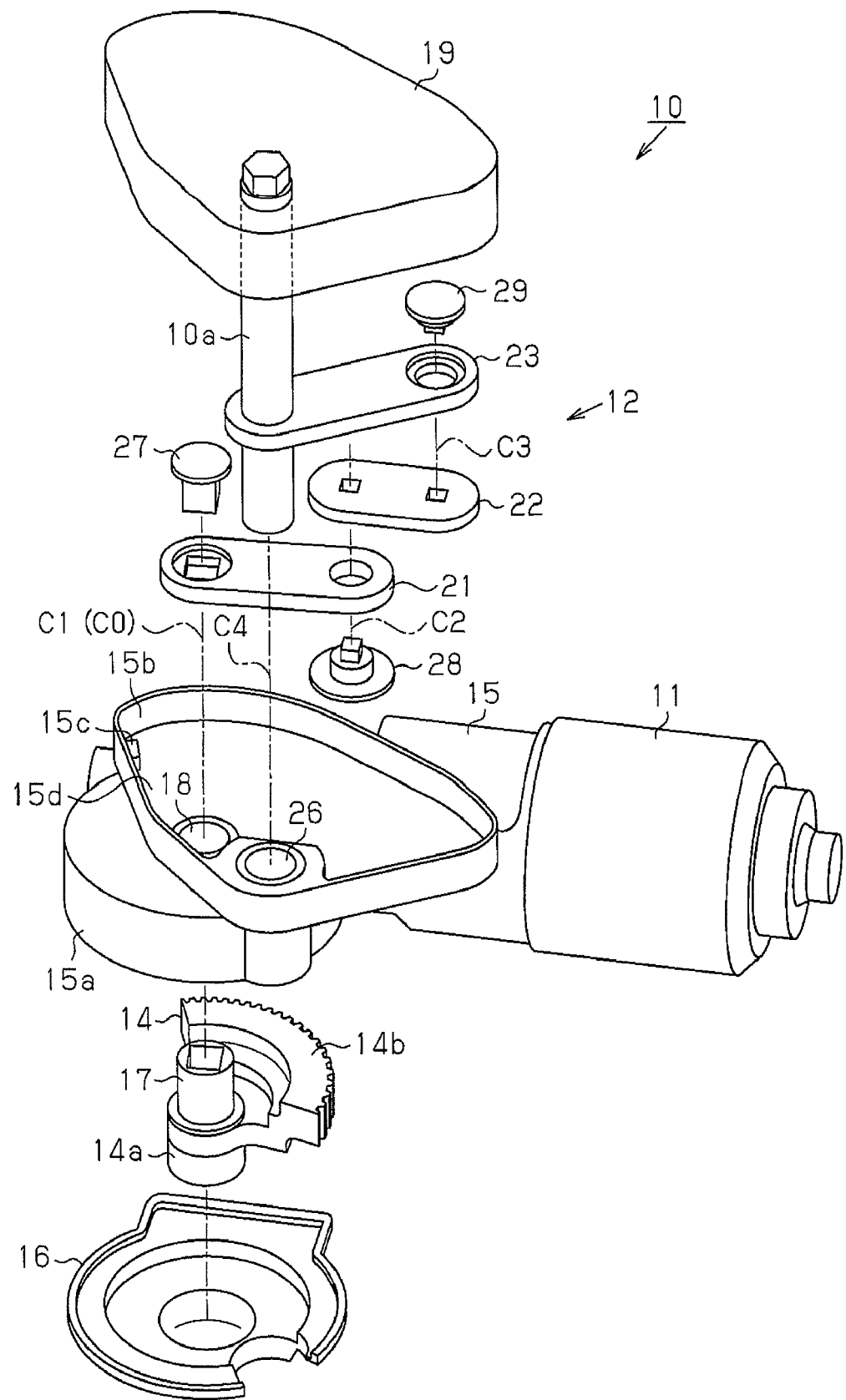
FIG. 4 is an exploded perspective view of the wiper motor in FIG. 2A.
Figure 5:
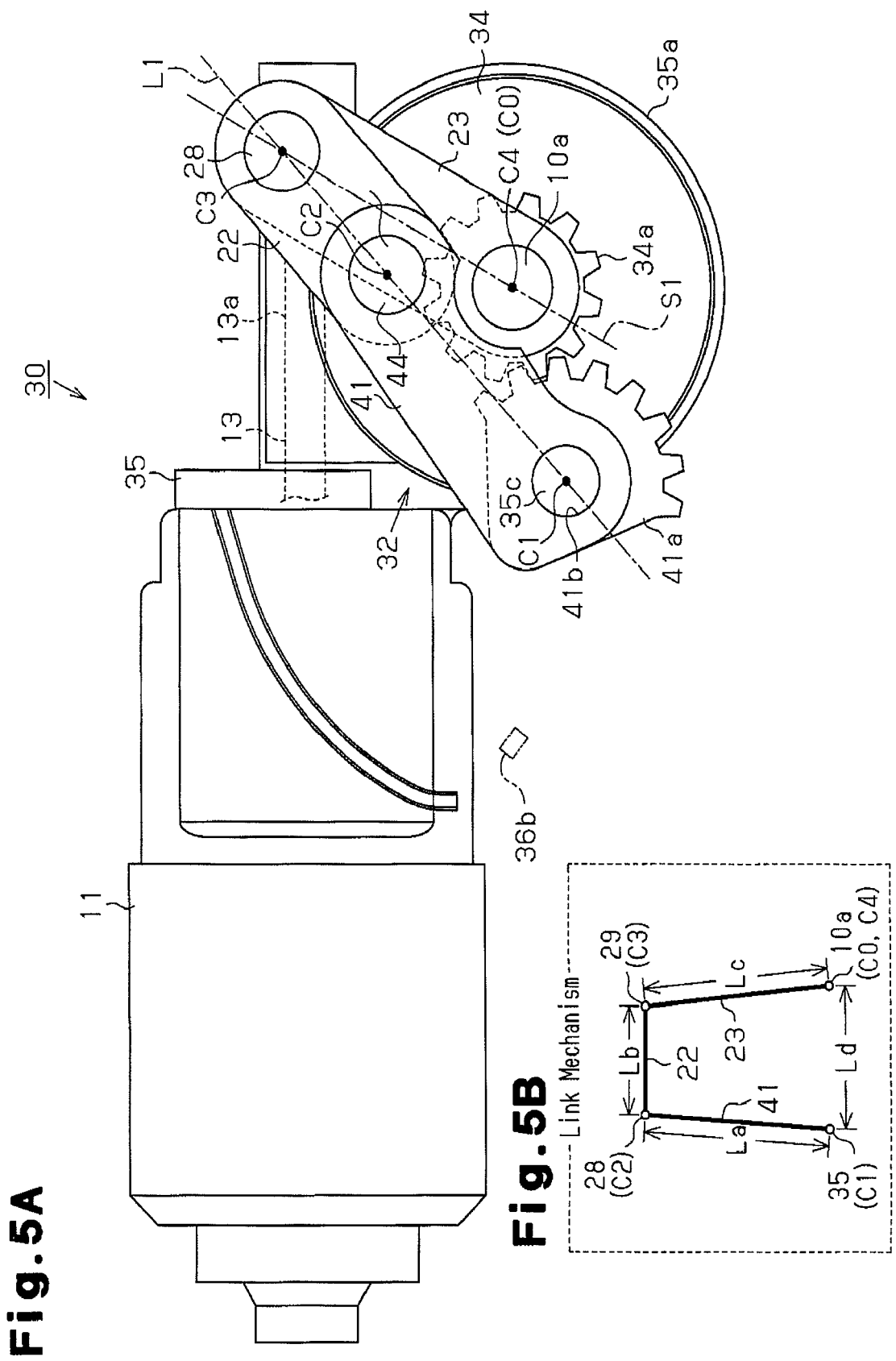
FIG. 5A is a plan view of a wiper apparatus in accordance with a second embodiment of the present invention.
FIG. 5B is a schematic view of the link mechanism shown in FIG. 5A.

As shown in FIGS. 2A and 4, the motor housing 15 integrally has a gear accommodation portion 15a and a link accommodation portion 15b. The gear accommodation portion 15a accommodates a sectoral reduction gear 14, and the link accommodation portion 15b accommodates the link mechanism 12. In the present embodiment, the gear accommodation portion 15a and the link accommodation portion 15b are open toward an opposite direction to each other with regard to an axial direction of the output shaft 10a. The motor housing 15 has a bottom plate 15d positioned between the gear accommodation portion 15a and the link accommodation portion 15b. The bottom plate 15d defines the gear accommodation portion 15a and the link accommodation portion 15b. In other words, the bottom plate 15d constructs both of a bottom portion of the gear accommodation portion 15a and a bottom portion of the link accommodation portion 15b.

As shown in FIGS. 2A and 4, the reduction gear in accordance with the present embodiment is constituted by the sectoral reduction gear 14. The sectoral reduction gear 14 has a reduction shaft 14a and a gear portion 14b. The gear portion 14b is formed as a sectoral shape extending outward from the reduction shaft 14a in a radial direction in a range of about 120°. In other words, the sectoral reduction gear 14 has a shape obtained by deleting one half or more from a general circular worm wheel while leaving only a part thereof. Gear teeth engaging with the worm gear 13a is formed in an outer peripheral surface of the sectoral reduction gear 14. An outer periphery of the sectoral reduction gear 14 defines a imaginary circle C. The sectoral reduction gear 14 and the worm gear 13a construct a reduction mechanism. The gear accommodation portion 15a rotatably accommodates the sectoral reduction gear 14. A gear cover 16 closes an opening of the gear accommodation portion 15a.

As shown in FIGS. 2A and 4, the reduction shaft 14a extends vertically to the gear portion 14b. The reduction shaft 14a includes a rotation transmitting shaft 17 fitted to the gear portion 14b. The bottom plate 15d has an input through hole 18 which is open to the gear accommodation portion 15a and the link accommodation portion 15b. The rotation transmitting shaft 17 passes through the bottom plate 15d by inserting the input through hole 18 serving as a transmission shaft hole, and extends to the link accommodation portion 15b from the gear accommodation portion 15a. A peripheral surface of the input through hole 18 rotatably supports the rotation transmitting shaft 17. The sectoral reduction gear 14 is rotated in a reciprocating manner at about 110° corresponding to a predetermined angle range, on the basis of the forward rotation and the reverse rotation of the motor shaft 13. The worm gear 13a is engaged with the sectoral reduction gear 14 without trouble. The sectoral reduction gear 14 is rotated at 110° so that the wiper 2 rotates between the lower reverse position P1 and the upper reverse position P2. The sectoral shape of the sectoral reduction gear 14 has a size capable of corresponding to the end positions of the forward and reverse rotations of the motor portion 11. In other words, the sectoral reduction gear 14 has a size corresponding to a reciprocating rotation of the sectoral reduction gear 14.

Since the sectoral reduction gear 14 expanded at 120° is rotated about 110°, an operating range A1 of the sectoral reduction gear 14 is about 230°. A range in which the sectoral reduction gear 14 is rotated in a reciprocating manner so as to pass through an inner portion of the imaginary circle C corresponds to the region of about 230°. A region in which the sectoral reduction gear 14 does not pass in the inner portion of the imaginary circle C, that is, a non-operating range A2 of the sectoral reduction gear 14 is about 130° (A1+A2=360°). The predetermined angle range of the sectoral reduction gear 14 is set such that the non-operating range A2 exists.

As shown in FIG. 2A and 2B, the link mechanism 12 has a first lever 21, a second lever 22, and a third lever 23. The rotation of the motor shaft 13 is reduced by the sectoral reduction gear 14, and swings the first lever 21. In other words, the sectoral reduction gear 14 is arranged between the motor portion 11 and the link mechanism 12. The swinging motion of the first lever 21 swings the third lever 23 via the second lever 22. The output shaft 10a integrally swings with the third lever 23. In other words, the first lever 21 functions as a crank reciprocating on the basis of the rotation of the motor shaft 13. The third lever 23 functions as a lever integrally rotating with the output shaft 10a. The second lever 22 functions as a rod coupling the crank to the third lever 23.

Figure 2:
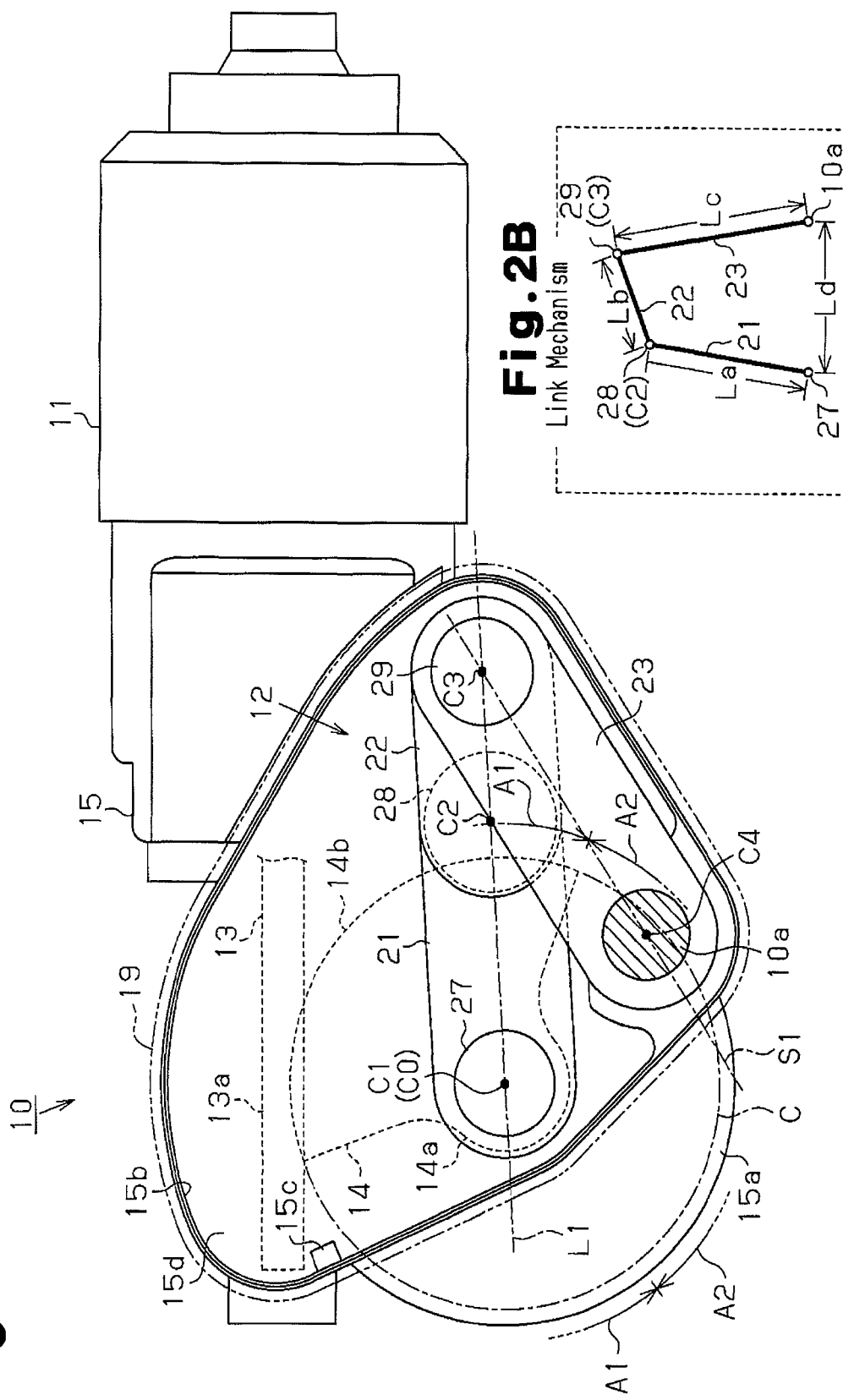
FIG. 2A is a plan view of the wiper motor in FIG. 1.
FIG. 2B is a schematic view of the link mechanism shown in FIG. 2A.

As shown in FIGS. 2 and 4, a first coupling pin 27 couples a distal end of the rotation transmitting shaft 17 to a proximal end of the first lever 21 so as to be integrally rotatable. A second coupling pin 28 couples a distal end of the first lever 21 to a proximal end of the second lever 22 so as to be relatively rotatable. A third coupling pin 29 couples a distal end of the second lever 22 to a distal end of the third lever 23 so as to be relatively rotatable. A proximal end of the third lever 23 is coupled to the output shaft 10a so as to be integrally rotatable.

As shown in FIG. 4, the proximal end of the third lever 23 is fixed to a portion near a center in an axial direction of the output shaft 10a. The motor housing 15 has an output bearing 26 rotatably supporting the proximal end of the output shaft 10a. The output bearing 26 serving as the output supporting portion is integrally formed in the motor housing 15. The output shaft 10a and the rotation transmitting shaft 17 extend so as to be in parallel to each other. A link cover 19 closes an opening of the link accommodation portion 15b. The distal end of the output shaft 10a protrudes to an outer portion from the link cover 19, and is fixed to the wiper arm 2a so as to be integrally rotatable.

The first lever 21, the second lever 22, the third lever 23, and the bottom plate 15d construct a four-lever linkage mechanism. The bottom plate 15d having the input through hole 18 and the output bearing 26 functions as a fixed fourth lever coupling the first lever 21 to the third lever 23. The first lever 21 is slightly shorter than the third lever 23. The second lever 22 has a length which is about one half of the first lever 21. The link mechanism 12 functions as a double lever mechanism rotating the output shaft 10a in a reciprocating manner in a range which is less than one half rotation.

As shown in FIGS. 2A and 2B, an axis of the sectoral reduction gear 14 is referred to as a gear axis C0, an axis of the first coupling pin 27 is referred to as a first axis C1, and an axis of the second coupling pin 28 is referred to as a second axis C2. An axis of the third coupling pin 29 is referred to as a third axis C3, and an axis of the output shaft 10a is referred to as a fourth axis C4. In the present embodiment, the first axis C1 coincides with the gear axis C0.

A distance between the first axis C1 and the second axis C2 is referred to as a first dimension La, and a distance between the second axis C2 and the third axis C3 is referred to as a second dimension Lb. A distance between the third axis C3 and the fourth axis C4 is referred to as a third dimension Lc, and a distance between the first axis C1 and the third axis C3 is referred to as an interaxial pitch Ld. The second dimension Lb means a dimension between the coupling points.

As shown in FIG. 2B, the first dimension La is slightly shorter than the third dimension Lc. The interaxial pitch Ld is shorter than the first dimension La, and is shorter than the third dimension Lc. The second dimension Lb is shorter than all of the first dimension La, the third dimension Lc, and the interaxial pitch Ld. A rotation angle range of the first lever 21 is about 110°, which is equal to the rotation angle range of the sectoral reduction gear 14. As a result, the rotation angle range θ of the third lever 23 and the output shaft 10a are each set to be 90° in the present embodiment. In other words, the rotation angle range θ of the output shaft 10a is set to be less than one half rotation.

As shown in FIG. 2A, substantially the entire output shaft 10a is positioned in the inner portion of the imaginary circle C of the sectoral reduction gear 14 and in the non-operating range A2, as seen from the axial direction of the output shaft 10a. In other words, in the present embodiment, one half or more of a cross section of the output shaft 10a is positioned in the inner portion of the imaginary circle C and in the non-operating range A2. In other words, a part of the output shaft 10a is positioned in the inner portion of the imaginary circle C and in the non-operating range A2 as seen from the axial direction of the output shaft 10a. The output shaft 10a arranged in the non-operating range A2 does not hamper the reciprocating rotation of the sectoral reduction gear 14.

Figure 3:
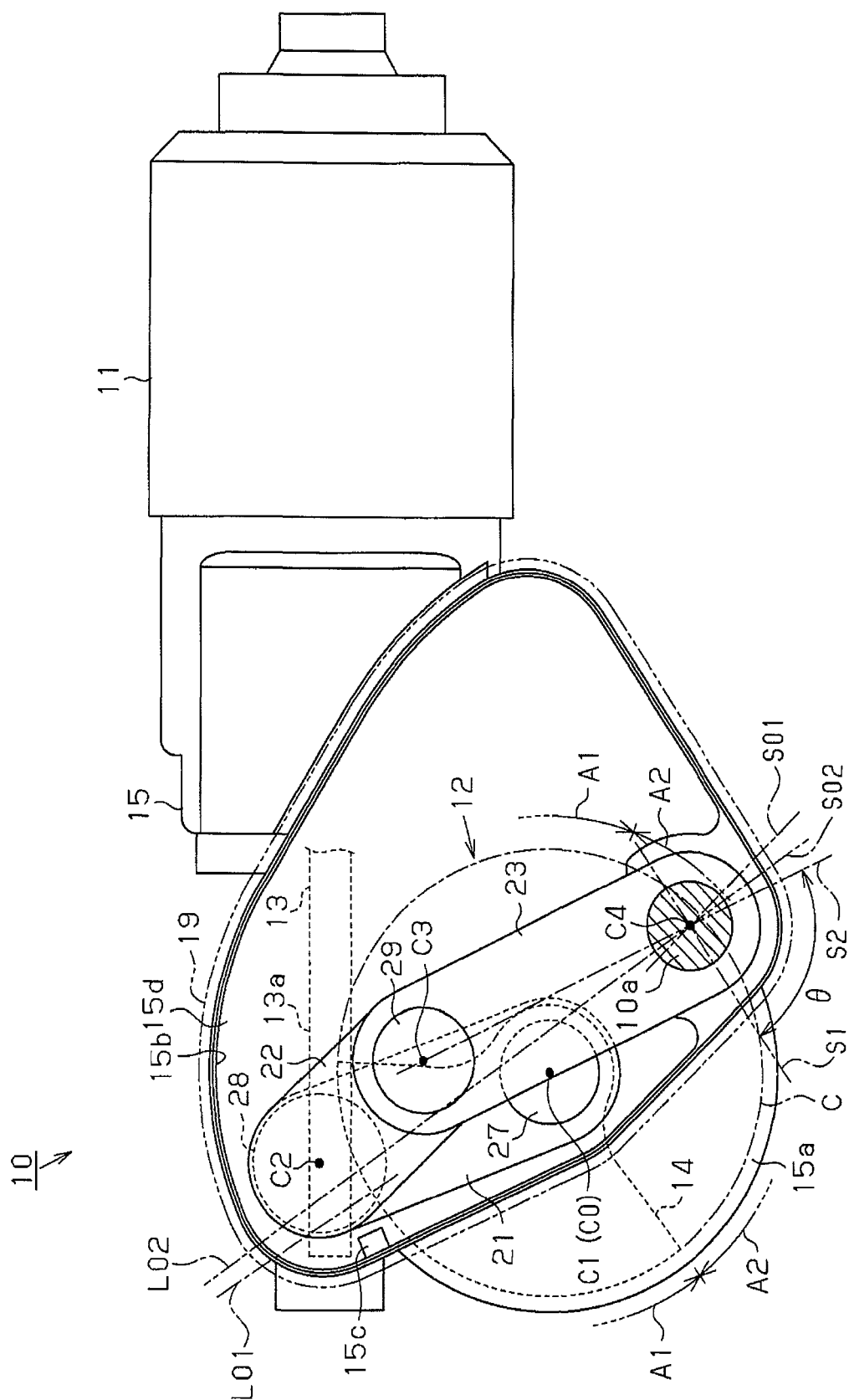
FIG. 3 is a view of an operation of the wiper motor in FIG. 2A.

The wiper control circuit X rotates the output shaft 10a and the third lever 23 in a reciprocating manner between a first reverse position S1 shown in FIG. 2A, and a second reverse position S2 shown in FIG. 3. In other words, the wiper control circuit X rotates the sectoral reduction gear 14 in a reciprocating manner between a rotation position in FIG. 2A and a rotation position in FIG. 3. The wiper control circuit X associates the first reverse position S1 with the lower reverse position P1 of the wiper 2, and associates the second reverse position S2 with the upper reverse position P2 of the wiper 2. As shown in FIG. 2A, the output shaft 10a is arranged in such a manner as to come close to the sectoral reduction gear 14 positioned at the first reverse position S1.

In the case shown in FIG. 2A, the first lever 21 and the second lever 22 are aligned on the first straight line L1. In this case, the first lever 21, the second lever 22 and the third lever 23 form a triangular shape. In the case that the first lever 21 and the second lever 22 are aligned on the first straight line L1, the output shaft 10a and the third lever 23 are regarded as positioned at the first position. The wiper control circuit X sets the first position at the first reverse position S1. The first axis C1, the second axis C2 and the third axis C3 are alphabetically aligned on the first straight line L1.

FIG. 3 shows a first imaginary straight line L01 and a second imaginary straight line L02. The first lever 21 and the second lever 22 are assumed to be aligned on the first imaginary straight line L01 independently from the first straight line L1. In the case that the first lever 21 and the second lever 22 are aligned on the first imaginary straight line L01, the output shaft 10a and the third lever 23 are assumed to be positioned at a first imaginary position S01 serving as the second position. In the case that the first lever 21 and the second lever 22 are aligned at the first imaginary straight line L01, the third axis C3 is positioned between the first axis C1 and the second axis C2. In other words, the second lever 22 of the first imaginary position S01 laps over the first lever 21.

As shown in FIG. 3, the second lever 22 and the third lever 23 are assumed to be aligned on the second imaginary straight line L02 prior to the first imaginary position S01. In the case that the second lever 22 and the third lever 23 are positioned on the second imaginary straight line L02, the output shaft 10a and the third lever 23 are assumed to be positioned at a second imaginary position S02. The third lever 23 positioned at the second imaginary position S02 is positioned between the first reverse position S1 and the first imaginary position S01. In other words, the second imaginary straight line L02 is positioned prior to the first imaginary position S01. The third lever 23 rotated from the first reverse position S1 in FIG. 2A is assumed to reach the second imaginary position S02 before reaching the first imaginary position S01.

As shown in FIG. 3, the second reverse position S2 of the third lever 23 is set to a position immediately before the second imaginary straight line L02. In other words, the third lever 23 rotated from the first reverse position S1 in FIG. 2A is reversed at the second reverse position S1 before reaching the second imaginary position S02, and is rotated again toward the first reverse position S1. In other words, the wiper control circuit X sets the output shaft 10a and the third lever 23 so as to prevent the output shaft 10a and the third lever 23 from reaching the first imaginary position S01 and the second imaginary straight line L02.

As shown in FIG. 3, the motor housing 15 has a stopper 15c regulating a movement of the first lever 21. If the third lever 23 moves toward the second imaginary position S02 from the second reverse position S2, the stopper 15c is brought into contact with the first lever 21. In other words, in the case that the first lever 21 is normally reversed at the upper reverse position P2, the stopper 15c does not interfere with the first lever 21. The stopper 15c is brought into contact with the first lever 21 before the third lever 23 reaches the second imaginary position S02.

The present embodiment has the following advantages.

(1) The sectoral reduction gear 14 is formed as the sectoral shape having an angle range which is not an obstacle in the engagement with the worm gear 13a. The angle range of the sectoral of the sectoral reduction gear 14 has a size corresponding to a reciprocating rotation in a predetermined angle range of the motor shaft 13. In other words, a portion which is not necessary for engaging with the worm gear 13a is omitted from the sectoral reduction gear 14. Accordingly, in comparison with the case in which the reduction gear is constituted by the circular worm wheel, it is possible to make the sectoral reduction gear 14 compact and light and it is possible to reduce a material cost. In other words, it is possible to downsize the motor housing 15.

Since the sectoral reduction gear 14 is rotated in a reciprocating manner in the predetermined angle range, the non-operating range A2 is generated in an inner portion of the imaginary circle C of the sectoral reduction gear 14. A part of the output shaft 10a can be arranged in the inner portion of the imaginary circle C and in the non-operating range A2 as seen from the axial direction of the output shaft 10a. As a result, it is possible to downsize the arranging space of the output shaft 10a. Accordingly, it is possible to make the wiper motor 10 compact and light.

(2) The sectoral reduction gear 14 engaging with the worm gear 13a is coupled to the first lever 21 so as to be integrally rotatable. Accordingly, it is possible to reduce a number of the parts of the reduction mechanism and it is possible to downsize the wiper motor 10.

(3) The link mechanism 12 is constituted by the double lever mechanism, and is provided with the first lever 21 coupled to the motor portion 11, the third lever 23 coupled to the output shaft 10a, and the second lever 22 coupling the first lever 21 to the third lever 23. The double lever mechanism shortens the second lever 22, and downsizes the wiper motor 10. The first lever 21 and the second lever 22 extending on the first straight line L1 function as a support rod mechanically regulating the movement of the third lever 23 at the first reverse position S1. Since the wiper 2 often receives an external force acting to move the wiper 2 to the outside of the operating range A1, the link mechanism 12 functioning as the support rod is suitable for the wiper motor 10.

(4) As shown in FIG. 2A, the first reverse position S1 at which the first lever 21 and the second lever 22 are aligned on the first straight line L1 is set at the lower reverse position P1 corresponding to the stop position of the wiper 2.

In the case of FIG. 2A, even if the external force is input to the output shaft 10a, the rotation of the third lever 23 is mechanically regulated on the basis of the posture of the link mechanism 12. In other words, the first lever 21 and the second lever 22 functions as the support rod regulating the rotation of the third lever 23. When at the stop position, the wiper 2 often receives the external force such as a snow fall, however, the first lever 21 and the second lever 22 aligned on the first straight line L1 mechanically regulate the movement of the third lever 23 caused by the external force. Accordingly, the position of the wiper 2 at the stop position is properly maintained. Therefore, in the case that the wiper motor 10 is driven next time, it is possible to properly carry out the wiping motion of the wiper 2. In other words, the normal operation of the wiper 2 at the next time is guaranteed.

(5) As shown in FIG. 3, the wiper control circuit X sets the upper reverse position P2 of the wiper 2 to the position immediately before the second imaginary straight line L02 on which the second lever 22 and the third lever 23 are aligned. Accordingly, the buckling hardly occurs. In other words, it is possible to prevent the buckling from being generated.

If the second reverse position S2 of the third lever 23 is set to the second imaginary straight line L02, the following buckling may occur. Since the external force such as relative wind or the like is applied to the wiper 2, the second lever 22 and the third lever 23 may be rotated outward beyond the second imaginary straight line L02. In this case, even if the motor portion 11 is reversed so as to rotate the first lever 21 toward the first reverse position S1, the third lever 23 is going to be rotated further outward as is known from the posture of the link mechanism 12.

However, in the present embodiment, a position immediately before the second imaginary straight line L02 is set as the second reverse position S2. Accordingly, since the second lever 22 and the third lever 23 do not reach the second imaginary straight line L02, it is possible to reliably reverse the third lever 23 from the upper reverse position P2.

(6) The second lever 22 is formed so as to be shorter than the first lever 21, shorter than the third lever 23 and shorter than the interaxial pitch Ld. Each of the rotating ranges of the first lever 21 and the third lever 23 is set to be less than one half rotation. Accordingly, it is possible to downsize the link mechanism 12 and the wiper motor 10.

(7) The motor housing 15 has the stopper 15c brought into contact with the first lever 21 in the case that the first lever 21 is positioned between the upper reverse position P2 and the second imaginary straight line L02. In other words, the stopper 15c mechanically regulates the further outward movement of the third lever 23. Accordingly, the stopper 15c reliably mechanically prevents the buckling which may be generated on the basis of the fact that the second lever 22 and the third lever 23 are aligned on the second imaginary straight line L02.

(8) The bottom plate 15d defines each of the gear accommodation portion 15a and the link accommodation portion 15b. The bottom plate 15d receives the load of the first lever 21 applied in the axial direction of the output shaft 10a over the operating range of the first lever 21. In other words, the bottom plate 15d achieves two functions. Accordingly, it is possible to downsize the wiper motor 10.

FIGS. 5A to 7 show a wiper motor 30 in accordance with a second embodiment of the present invention. The second embodiment has a circular reduction gear 34 corresponding to a circular worm wheel in place of the sectoral reduction gear 14. The output shaft 10a is arranged in such a manner as to rotate coaxially with the circular reduction gear 34. In other words, a gear axis C0 corresponding to an axis of the circular reduction gear 34 coincides with a fourth axis C4. In other words, the same reference numerals are attached to the same members as those of the first embodiment, and an overlapping description will be omitted.

Figure 6:
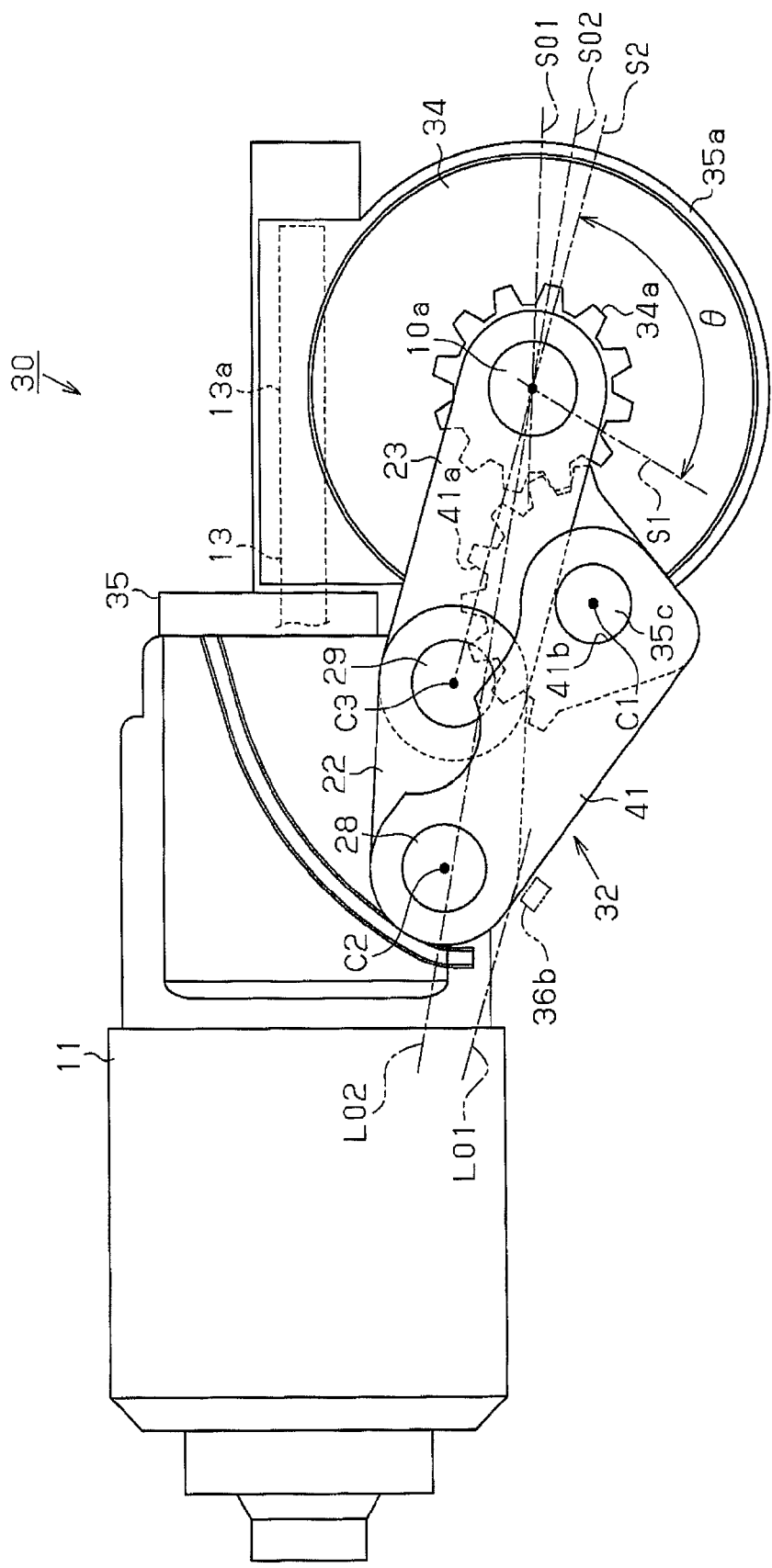
FIG. 6 is a view of an operation of the wiper motor in FIG. 5A.
Figure 7:
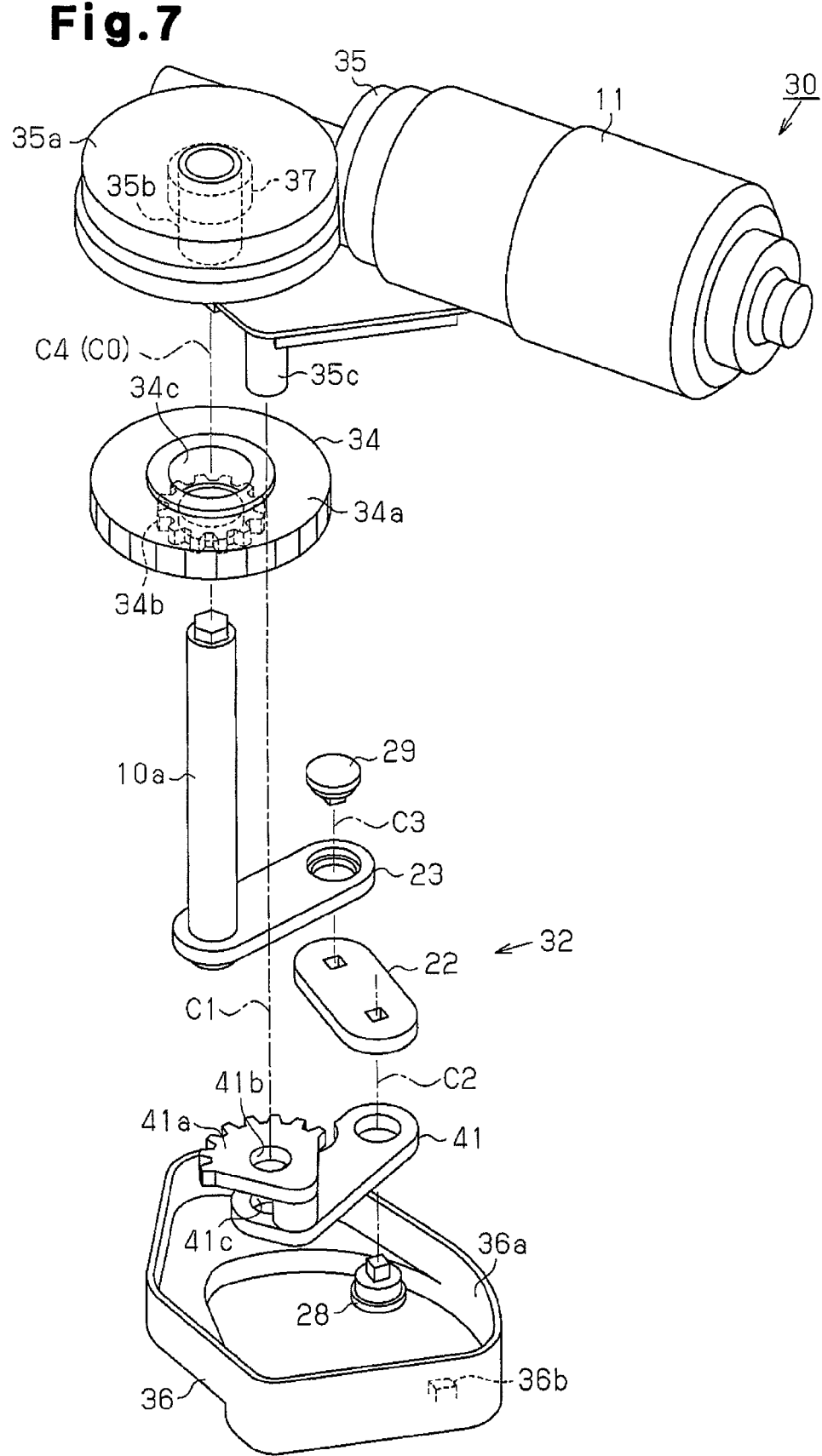
FIG. 7 is an exploded perspective view of the wiper motor in FIG. 5A.

As shown in FIG. 7, in the present embodiment, a motor housing 35 has a gear accommodation portion 35a, and a cover 36 has a link accommodation portion 36a. Since the cover 36 closes the gear accommodation portion 35a, the gear accommodation portion 35a and the link accommodation portion 36a form one accommodation space. FIGS. 5A and 6 show a view in which the cover 36 is detached.

As shown in FIGS. 5A and 7, the gear accommodation portion 35a accommodates the circular reduction gear 34. The circular reduction gear 34 is engaged with the worm gear 13a, and constructs a reduction mechanism. The circular reduction gear 34 has a large-diameter gear 34a engaging with the worm gear 13a, and a small-diameter gear 34b having a smaller diameter than the large-diameter gear 34a. The small-diameter gear 34b is integrally formed coaxially with the large-diameter gear 34a. The small-diameter gear 34b has gear teeth on an outer peripheral surface. The circular reduction gear 34 has a gear through hole 34c passing through a center of the large-diameter gear 34a and a center of the small-diameter gear 34b. The gear accommodation portion 35a has a cylindrical support tube 35b. The support tube 35b passes through a gear bearing 37. The support tube 35b passes through the gear through hole 34c. The support tube 35b rotatably supports the circular reduction gear 34 via the gear bearing 37. In other words, the gear bearing 37 rotatably supports an inner peripheral surface of the gear through hole 34c with respect to an outer peripheral surface of the support tube 35b. The output shaft 10a is inserted to an inner portion of the support tube 35b. The support tube 35b rotatably supports the output shaft 10a via a bearing (not shown) installed to an inner peripheral surface of the support tube 35b. The output shaft 10a passes through the gear through hole 34c, protrudes to an outer portion of the gear accommodation portion 35a, and is fixed to the wiper arm 2a so as to be integrally rotatable.

As shown in FIGS. 5A and 7, the link accommodation portion 36a accommodates a link mechanism 32. The link mechanism 32 is drivingly coupled to the motor portion 11, and is integrally assembled in the motor portion 11. The link mechanism 32 includes a first lever 41, a second lever 22, and a third lever 23. The first lever 41 has a lever gear 41a serving as a coupling gear engaging with the small-diameter gear 34b. The rotation of the motor shaft 13 is decelerated by the circular reduction gear 34, and swings the first lever 41. The swinging motion of the first lever 41 swings the third lever 23 via the second lever 22. The output shaft 10a is integrally swung with the third lever 23. In other words, the first lever 41 functions as a crank that swings in a is reciprocating manner on the basis of the rotation of the motor shaft 13.

As shown in FIG. 7, the gear accommodation portion 35a has a support column 35c extending in parallel to the support tube 35b. The sectoral lever gear 41a is positioned at a proximal end of the first lever 41. The lever gear 41a has a through hole 41b having a circular cross section, and a proximal end of the first lever has a similar through hole 41c. Since the support column 35c passes through the through hole 41b and the through hole 41c, the support column 35c rotatably supports the first lever 41. The first axis C1 of the present embodiment corresponds to an axis of the support column 35c. The gear axis C0 of the present embodiment is different from the first axis C1.

The second coupling pin 28 couples a distal end of the first lever 41 to a proximal end of the second lever 22 so as to be relatively rotatable. The third coupling pin 29 couples a distal end of the second lever 22 to a distal end of the third lever 23 so as to be relatively rotatable. A proximal end of the third lever 23 is fixed to the proximal end of the output shaft 10a so as to be integrally rotatable.

The first lever 41, the second lever 22, the third lever 23 and the gear accommodation portion 35a construct a four-lever linkage mechanism. In other words, the gear accommodation portion 35a having the gear bearing 37 and the support tube 35b functions as a fixed fourth lever coupling the first lever 41 to the third lever 23. The first lever 41 is somewhat shorter than the third lever 23. The second lever 22 has a length which is about one half of the first lever 41. The link mechanism 32 functions as a both-lever mechanism rotating the output shaft 10a in a reciprocating manner in a range which is less than one half rotation.

The length of the first lever 41 is substantially the same as the length of the first lever 21. The relationship among the first dimension La, the second dimension Lb, the third dimension Lc, and the interaxial pitch Ld is set to the same as the first embodiment, in such a manner that the rotation angle range θ of the output shaft 10a becomes less than one half rotation. In other words, the rotation angle of the first lever 41 is about 110° of the first lever 41, and the rotation angle of the third lever 23 is set to about 90°.

The wiper control circuit X rotates the output shaft 10a and the third lever 23 in a reciprocating manner between a first reverse position S1 shown in FIG. 5A and a second reverse position S2 shown in FIG. 6. In other words, the wiper control circuit X rotates the circular reduction gear 34 in a reciprocating manner between the rotating position in FIG. 5A and the rotating position in FIG. 6. The wiper control circuit X associates the first reverse position S1 with the lower reverse position P1 of the wiper 2, and associates the second reverse position S2 with the upper reverse position P2 of the wiper 2.

As shown in FIGS. 6 and 7, the link accommodation portion 36a has a stopper 36b regulating the movement of the first lever 41. In other words, the stopper 36b of the present embodiment is provided in the cover 36. The stopper 36b reliably mechanically prevents buckling of the third lever 23.

The wiper motor 30 in FIGS. 5A to 7 has the following advantages. The output shaft 10a is arranged coaxially with the circular reduction gear 34. In other words, the support tube 35b rotatably supports the output shaft 10a, and rotatably supports the circular reduction gear 34 via the gear bearing 37. Accordingly, it is possible to arrange the output shaft 10a in an inner portion of the circular reduction gear 34. Therefore, it is possible to downsize the wiper motor 30. Further, the wiper motor 30 has the same advantages as the advantages (3) to (7) of the wiper motor 10 in FIGS. 1 to 4.

The embodiments mentioned above may be modified as follows.

In FIG. 2A, the entire output shaft 10a may be arranged in the inner portion of the imaginary circle C of the sectoral reduction gear 14 and in the non-operating range A2, as seen from the axial direction of the output shaft 10a. The position of the output shaft 10a may be changed as long as this condition is satisfied.

The wiper control circuit X may associate the first reverse position S1 with the upper reverse position P2 of the wiper 2, and associate the second reverse position S2 with the lower reverse position P1.

The stopper 15c may be provided with an elastic member preventing a collision noise with the first lever 21. In the same manner, the stopper 36b may be provided with an elastic member preventing the collision noise with the first lever 41.

The stopper 15c is not limited to be brought into contact with the first lever 21. The stopper 15c may be formed in such a manner as to be brought into contact with at least one of the first lever 21, the second lever 22, and the third lever 23. In the same manner, the stopper 36b of the second embodiment may be formed in such a manner as to be brought into contact with at least one of the first lever 41, the second lever 22, and the third lever 23.

The motor portion 11 is not limited to the direct-current motor with a feed brush. The reduction mechanism in accordance with the first embodiment is not limited to have one sectoral reduction gear 14, but may be provided with a plurality of reduction gears. The shape and the layout of each of the members of the link mechanism 12 may be changed as necessary. In the same manner, the reduction mechanism in accordance with the second embodiment is not limited to have one circular reduction gear 34, but may be provided with a plurality of reduction gears.

The wiper motors 10 and 30 are not limited to drive the front wiper wiping the vehicle front glass 1, but may drive a rear wiper wiping a rear glass.

The structure is not limited to be made such that one wiper motor 10 drives one wiper 2, but may be made such that one wiper motor 10 drives a pair of wipers 2. In the same manner, one wiper motor 30 may drive a pair of wipers 2.

The motor device in accordance with the present invention is not limited to the wiper motor driving the wiper 2, but may be applied to a motor driving a vehicle side mirror. For example, the side mirror is attached to an arm protruding from an assistant driver seat of a truck vehicle. The motor device in accordance with the present invention may be applied to a motor for storing and developing the side mirror together with the arm. For example, the first reverse position S1 corresponds to a stored position of the side mirror, and the second reverse position S2 corresponds to a developed position of the side mirror.

The invention claimed is:

1. A motor device comprising:
a motor portion having
a rotary shaft and
a worm gear integrally formed with said rotary shaft, said motor portion being capable of rotating the rotary shaft forward and in reverse;
a link mechanism drivingly coupled to the motor portion, the link mechanism being integrally assembled in the motor portion;
a sectoral reduction gear arranged between-the motor portion and the link mechanism,
the sectoral reduction gear rotating in a reciprocating manner in a predetermined angle range on the basis of the forward rotation and the reverse rotation of the motor portion,
the sectoral shape of the sectoral reduction gear having a size corresponding to the reciprocating rotation of the sectoral reduction gear,
the sectoral reduction gear having
an outer circumferential surface,
an outer periphery, and
gear teeth formed on the outer circumferential surface for engaging the worm gear,
the outer periphery being part of a representative circle, and
an inner region of the representative circle having an operating range, in which the sectoral reduction gear rotating in a reciprocating manner in the predetermined angle range passes, and a non-operating range, in which the sectoral reduction gear does not pass; and
an output shaft that is rotated in a reciprocating manner by the link mechanism, a part of or the whole of the output shaft being arranged in the non-operating range as seen from an axial direction of the output shaft.

2. The motor device according to claim 1, wherein the link mechanism comprises:
a first lever that is swung in a reciprocating manner by the motor portion;
a third lever to which the output shaft is fixed so as to be integrally rotatable; and
a second lever coupling the first lever to the third lever so as to make the output shaft rotatable.

3. The motor device according to claim 2, wherein
the first lever rotates around a first axis,
the second lever rotates around a second axis with respect to the first lever,
the third lever rotates around a third axis with respect to the second lever,
a distance between the first axis and an axis of the output shaft defines an inter-axial pitch, and
a distance between the second axis and the third axis defines a coupling point dimension, and
wherein the link mechanism is structured such that the coupling point dimension is shorter than the inter-axial pitch.

4. The motor device according to claim 2,
wherein the sectoral reduction gear is coupled to the first lever so as to be integrally therewith.

5. The motor device according to claim 2,
wherein a motor housing is assembled to the motor portion, and
wherein the motor housing has
a gear accommodation portion accommodating the sectoral reduction gear, and
a link accommodation portion for accommodating the link mechanism.

6. The motor device according to claim 5, wherein
the gear accommodation portion and the link accommodation portion are open to mutually opposite sides with respect to an axial direction of the output shaft, and
the motor housing has a bottom plate dividing the gear accommodation portion and the link accommodation portion from each other.

7. The motor device according to claim 6,
wherein the sectoral reduction gear has a rotation transmitting shaft coupled to the first lever so as to be integrally rotatable, and
wherein the bottom plate has an input through hole corresponding to a through hole penetrated by the rotation transmitting shaft, and
wherein a peripheral surface of the input through hole rotatably supports the rotation transmitting shaft, so that the rotation transmitting shaft passes through the bottom plate so as to extend to the gear accommodation portion and the link accommodation portion.

8. The motor device according to claim 5, wherein an output support portion rotatably supporting the output shaft is integrally formed in the motor housing.

9. The motor device according to claim 1, wherein the motor device is a wiper motor driving a vehicle wiper, and the vehicle wiper is coupled to the output shaft so as to wipe a surface-to-be-wiped of a vehicle.

10. A motor device comprising:
a motor portion assembled with a motor housing and being capable of rotating forward and in reverse, said motor housing having a link accommodating portion integrally formed therein;
an output shaft placed in said link accommodating portion; and
a link mechanism drivingly coupled to the motor portion, the link mechanism being accommodated in the link accommodating portion so that the link mechanism is integrally assembled in the motor portion,
the link mechanism rotating the output shaft in a reciprocating manner between a first reverse position and a second reverse position, the first reverse position serving as a stop position of the output shaft,
wherein the link mechanism comprises:
a first lever that is swung in a reciprocating manner by the motor portion;
a third lever to which the output shaft is fixed so as to be integrally rotatable therewith; and
a second lever coupling the first lever to the third lever in such a manner as to make the output shaft rotatable,
wherein the link mechanism sets a rotation angle range of the output shaft to be less than one half rotation,
wherein
the output shaft is positioned at a first position when the first lever and the second lever are aligned along a first straight line,
the output shaft would be positioned at a second position if the first lever and the second lever were aligned on a third straight line, and
the output shaft would be positioned at a third position if the second lever and the third lever were aligned along a fourth straight line, and
wherein the first reverse position is set to the first position, and the second reverse position is set to a position between the first position and the third position, and immediately adjacent to the third position.

11. The motor device according to claim 10, wherein
the first lever rotates around a first axis,
the second lever rotates around a second axis with respect to the first lever,
the third lever rotates around a third axis with respect to the second lever,
a distance between the first axis and an axis of the output shaft defines an inter-axial pitch, and
a distance between the second axis and the third axis defines a coupling point dimension, and
wherein the link mechanism is structured such that the coupling point dimension is shorter than the inter-axial pitch.

12. The motor device according to claim 10, further comprising
a link accommodation portion accommodating the link mechanism, the link accommodation portion having a stopper,
wherein the stopper is capable of being brought into contact with at least one of the first lever, the second lever and the third lever so as to regulate the movement of the third lever from the second reverse position to the third position.

13. The motor device according to claim 10, wherein the motor portion comprises
a rotary shaft provided with a worm gear,
the rotary shaft being rotated between an end position of a forward rotation and an end position of a reverse rotation of the motor portion, and
wherein the motor device further comprises
a sectoral reduction gear engaging with the worm gear, the sectoral reduction gear transmitting a driving force of the motor portion to the link mechanism, and having a sectoral shape sized to correspond to the end positions of the forward rotation and the reverse rotation of the motor portion.

14. The motor device according to claim 10, wherein the motor portion comprises
a rotary shaft provided with a worm gear, and
a reduction gear engaging with the worm gear, the reduction gear transmitting a driving force of the motor portion to the link mechanism, and being arranged to rotate coaxially with the output shaft.

15. The motor device according to claim 10, wherein the motor device is a wiper motor driving a vehicle wiper, and the vehicle wiper is coupled to the output shaft so as to wipe a surface-to-be-wiped of the vehicle.

16. The motor device according to claim 15, wherein
the vehicle wiper is rotated in a reciprocating manner between a lower reverse position and an upper reverse position, the lower reverse position serving as a stop position of the vehicle wiper, and the first reverse position being associated with the lower reverse position, and
wherein the second reverse position is associated with the upper reverse position.

17. A wiper apparatus comprising:
a wiper that is rotated in a reciprocating manner between a lower reverse position and an upper reverse position, the lower reverse position serving as a stop position of the wiper;
a motor device as recited in claim 10 for driving the wiper; and
a wiper control circuit controlling the motor device.

18. A motor device comprising: a motor portion assembled with a motor housing and being capable of rotating forward and in reverse, said motor housing having a link accommodating portion integrally formed therein;
an output shaft; and a link mechanism drivingly coupled to the motor portion, the link mechanism being accommodated in the link accommodating portion so that the link mechanism is integrally assembled in the motor portion, the link mechanism rotating the output shaft in a reciprocating manner between a first reverse position and a second reverse position, the first reverse position serving as a stop position of the output shaft, wherein the link mechanism comprises: a first lever that is swung in a reciprocating manner by the motor portion; a third lever to which the output shaft is fixed so as to be integrally rotatable therewith; and a second lever coupling the first lever to the third lever in such a manner as to make the output shaft rotatable, wherein the link mechanism sets a rotation angle range of the output shaft to be less than one half rotation, wherein the output shaft is positioned at a first position when the first lever and the second lever are aligned along a first straight line, the output shaft would be positioned at a second position if the first lever and the second lever were aligned on a third straight line, and the output shaft would be positioned at a third position if the second lever and the third lever were aligned along a fourth straight line, and wherein the first reverse position is set to the first position, and the second reverse position is set to a position between the first position and the third position, and immediately adjacent to the third position, wherein the motor portion comprises a rotary shaft provided with a worm gear, the rotary shaft being rotated between an end position of a forward rotation and an end position of a reverse rotation of the motor portion, and wherein the motor device further comprises a sectoral reduction gear engaging with the worm gear, the sectoral reduction gear transmitting a driving force of the motor portion to the link mechanism, and having a sectoral shape sized to correspond to the end positions of the forward rotation and the reverse rotation of the motor portion.

* * * * *